(12) United States Patent
Wu et al.

(10) Patent No.: US 6,646,575 B2
(45) Date of Patent: Nov. 11, 2003

(54) CIRCUIT AND METHOD FOR PROTECTING THE RUN LENGTH IN RLL CODE

(75) Inventors: Wen-Yi Wu, Hsin Chu (TW); Kuen-suey Hou, Yun Lin (TW)

(73) Assignee: Media TEK Inc. (TW)

( * ) Notice: Subject to any disclaimer, the term of this patent is extended or adjusted under 35 U.S.C. 154(b) by 0 days.

(21) Appl. No.: 10/142,779

(22) Filed: May 13, 2002

(65) Prior Publication Data

US 2002/0172096 A1 Nov. 21, 2002

(30) Foreign Application Priority Data

May 15, 2001 (TW) ........................................ 90111662 A

(51) Int. Cl.[7] .............................................. H03M 7/00
(52) U.S. Cl. ..................... 341/59; 369/59.19; 369/59.17
(58) Field of Search .................. 341/58, 59; 369/59.17, 369/59.18, 59.19; 714/809–812

(56) References Cited

U.S. PATENT DOCUMENTS 6,094,408 A * 7/2000 Verboom ...................... 369/59

* cited by examiner

*Primary Examiner*—Howard L. Williams
(74) *Attorney, Agent, or Firm*—Birch, Stewart, Kolasch & Birch, LLP

(57) ABSTRACT

A circuit and method for protecting the run length in RLL (run length limited) code is proposed to correct the illegal run length in an EFM (eight to fourteen modulation) signal. The proposed circuit comprises a sampling unit for sampling a RF signal with a high frequency sampling clock, and generating a high frequency sampling signal. The frequency of the high frequency sampling clock is higher then the frequency of the EFM signal. A detector is employed to receive and to detect the high frequency sampling signal whether there is any illegal run length in the EFM signal, and to generate control signals. Two reference signal generators are employed to generate an ideal front reference signal and an ideal rear reference signal, respectively, corresponding to the control signals. A first difference generator and a second difference generator are employed to generate a first difference and a second difference according to the front and rear reference signals and the high frequency sampling signal, respectively. A comparator is employed to generate a select signal according to first difference and the second difference. And an output unit is employed to output a correct EFM signal by selecting a reference signal from the front reference signal and the rear reference signal according to the select signal.

12 Claims, 5 Drawing Sheets

CIRCUIT AND METHOD FOR PROTECTING THE RUN LENGTH IN RLL CODE

BACKGROUND OF THE INVENTION

A. Field of the Invention

The present invention relates to a circuit and method for protecting the run length in RLL (run-length-limited) code. More particularly, it relatives to a circuit for protecting the run length in RLL code to prevent the illegal run length in an EFM signal.

B. Description of the Related Art

In an optical reproducing and recording system, an EFM (eight-bit to fourteen-bit modulation) signal needs to satisfy the requirements for the minimum run length (minimum continuation length) and the maximum run length (minimum continuation length). As illustrative examples, the CD (Compact Disk) systems require the minimum run length of 3 T and the maximum run length of 11 T, and the DVD (Digital Versatile Disk) systems require the minimum run length of 3 T and the maximum run length of 14 T. When the run length of a received EFM signal is exceeded the aforementioned run length requirements, that is, the run length in the EFM signal is illegal and is mixed with noise so as to induce a malfunction. In general, the minimum run length in the EFM signal is 3 T, but the illegal run length in the EFM signal may be 2 T or 1 T. The illegal run length will be transited immediately to the error correction block of the system and will be corrected. However, if there're more illegal EFM signals to be transited to the error correction block, the performance of the system will be influenced seriously. Hence, a circuit for protecting the run length in RLL code is essential to prevent the illegal run length in the EFM signals.

FIG. 1 is a time chart according to U.S. Pat. No. 6,014,096 "Data decoding method and device". The principle of the patent is described below. When there is an illegal run length in the EFM signal, the data decoding method is to measure the time measurement A between the preceding sampling edge of a sampling clock and the front edge of the RF signal and to measure the time measurement B between the next sampling edge of the sampling clock and the rear edge of the RF signal. And then, to correct the run length in the EFM signal sampled from the RF signal according to the time measurement A and B. If B is shorter than A, then correct the preceding sampled signals of the illegal run length in the EFM signal from "0" to "1", and otherwise correct the following sampled signals of the illegal run length in the EFM signal from "1" to "0". But this data decoding method doesn't follow the maximum likelihood criterion as known.

Another known method is a decoding method according to a Viterbi algorithm, which calculates all the total path metrics of each possibly ideal signal by taking account of various possibly ideal signal with the real RF signal reproduced from a recording medium, and retrieves the shortest one from all the total path metrics as a correct path, and then gets a correct EFM signal against the previous processing. As shown in FIG. 2, the Viterbi algorithm could obtain a correct EFM signal. But the Viterbi decoder of the aforementioned method has a drawback that needs to complicate its structure and to increase the hardware scale due to calculating all the total path metrics of possibly ideal signal in each path.

SUMMARY OF THE INVENTION

In view of the above-mentioned problems, an object of the invention is to provide a circuit for protecting the run length in RLL code to prevent the illegal run length in an EFM signal. When the illegal run length in the EFM signal is detected, the circuit generates a correct EFM signal based on a difference signal by comparing the front and rear reference signal of the EFM signal so as to prevent the illegal run length in the EFM signal.

To achieve the above-mentioned object, a circuit for protecting the run length in RLL code, and correcting the illegal run length in a EFM signal, the circuit comprising: a sampling unit for sampling an EFM signal by a sampling clock with higher frequency than the EFM signal, and generating a sampling signal; a detector for receiving the sampling signal, and detecting whether the run length in the EFM signal is illegal, and generating a control signal; a front reference signal generator for generating a front reference signal corresponding to the illegal EFM signal according to the control signal generated from the detector; a rear reference signal generator for generating a rear reference signal corresponding to the illegal EFM signal according to the control signal generated from the detector; a first difference signal generator for generating a first difference signal based on the front reference signal and the illegal EFM signal; a second difference signal generator for generating a second difference signal based on the rear reference signal and the illegal EFM signal; a comparator for generating a comparing signal based on the first difference signal and the second difference signal; and an output unit for outputting a correct EFM signal corrected from the run length in the illegal EFM signal according to the comparing signal.

DETAIL DESCRIPTION OF THE INVENTION

Now, the circuit for protecting the run length in RLL code in accordance with an embodiment of the present invention will be described in the following with reference to the accompanying drawings.

The present invention of a circuit for protecting the run length in RLL (run length limited) code employs a sampling clock with higher frequency than the EFM signal to sample a RF signal. When there are illegal run length in the EFM signal, the circuit generates a correct EFM signal based on a difference signal by comparing the front and rear reference signal of the EFM signal so as to prevent the illegal run length in the EFM signal.

Figure 1:
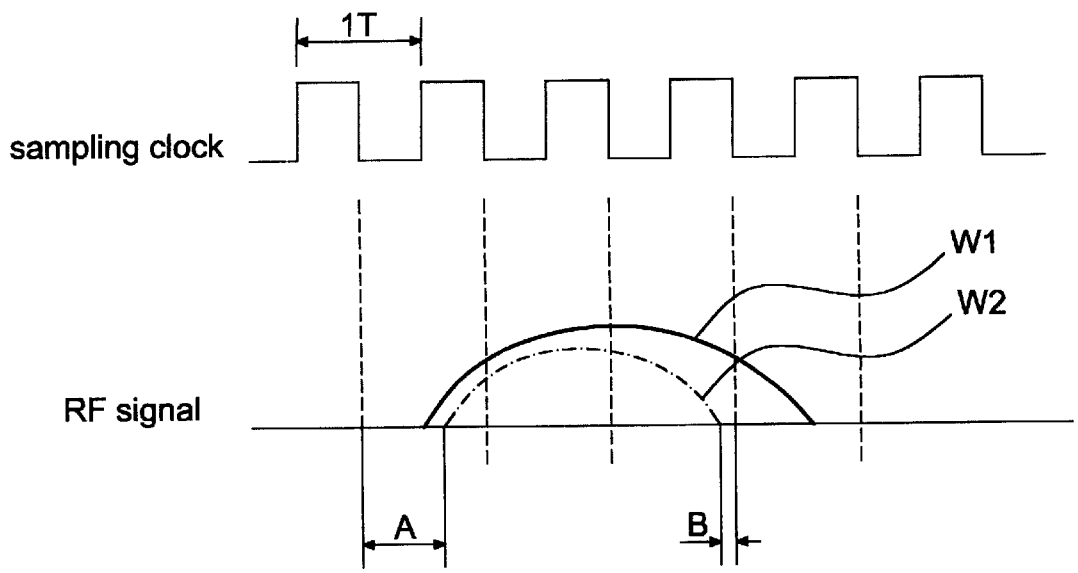
FIG. 1 is a time chart showing the operation performed by an prior art for protecting the run length in RLL code.
Figure 2:
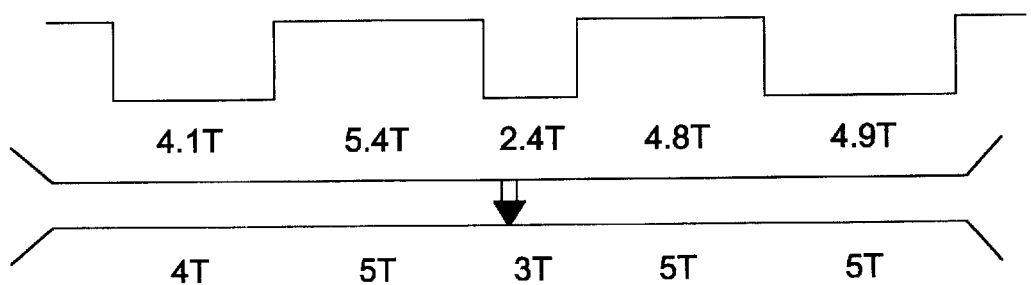
FIG. 2 is a time chart showing a correct EFM signal obtained by using a Viterbi algorithm for protecting the run length in RLL code.
Figure 3:
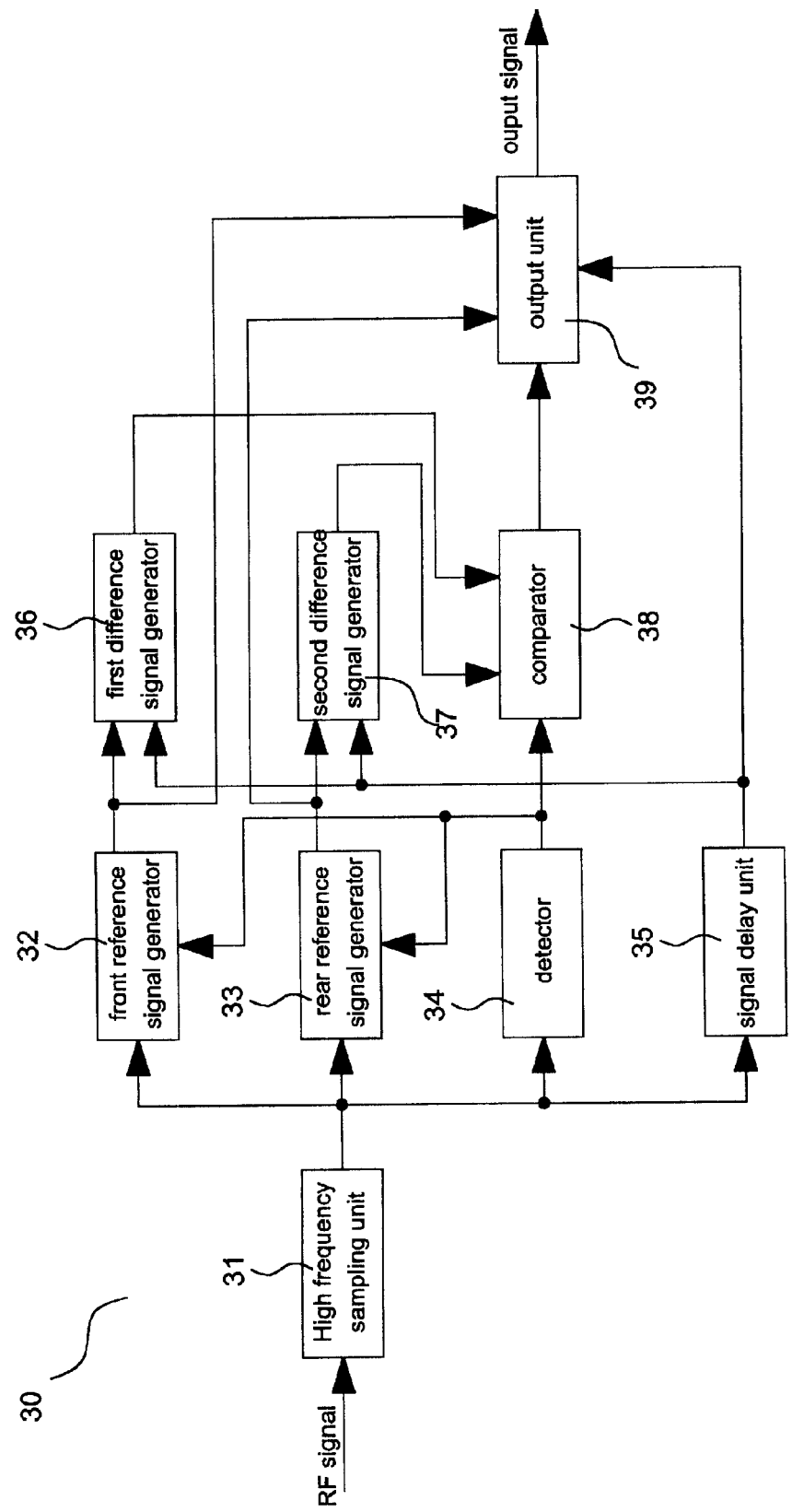
FIG. 3 is a block diagram showing a circuit for protecting the run length in RLL code of the present invention.

FIG. 3 is a block diagram showing a circuit for protecting the run length in RLL code of the present invention. As shown in FIG. 3, the circuit comprises a high frequency sampling unit (31) for sampling the RF signal, a detector (34) for detecting illegal run length in the EFM signal, a front reference signal generator (32), a rear reference signal generator (33), a signal delay unit (35), a first difference signal generator (36), a second difference signal generator (37), a comparator (38), and an output unit (39).

The high frequency sampling unit (31) receives a RF signal and samples the RF signal with a high frequency sampling clock with higher frequency than the EFM signal to generate a high frequency sampling signal. The frequency of the high frequency sampling clock may be double times of the sampling frequency of the EFM signal and can be employed to sample the rising edge and falling edge of the RF signal. Hence, the frequency of the high frequency sampling clock may be also four or plurality times of the sampling frequency of the EFM signal to sample the RF signal.

The detector (34) receives the sampling signal and detects whether the run length in the EFM signal is illegal. Besides, the detector (34) also receives the EFM signal and detects directly whether the run length in the EFM signal is illegal. For example, in the CD systems if the run length in the EFM signal is 1 T, 2 T, or beyond 11 T, then the run length is regarded as an illegal EFM signal by the detector (34).

The front reference signal generator (32) and the rear reference signal generator (33) generate respectively a front reference signal and a rear reference signal based on the types of the illegal run length. The types of the illegal run length in RLL code include shorter than the minimum run length and longer than the maximum run length. When the illegal run length in RLL code is shorter than the minimum run length, the front reference signal is the reference signal to convert the front portion of the illegal EFM signal from "0" to "1" and the rear reference signal is the reference signal to convert the rear portion of the illegal EFM signal from "1" to "1". When the illegal run length in RLL code of EFM signal is longer than the maximum run length, the front reference signal is the reference signal to convert the front portion of the illegal EFM signal from "1" to "0" and the rear reference signal is the reference signal to convert the rear portion of the illegal EFM signal from "0" to "1". Hence, the time difference between the front reference signal and rear reference signal is 1 T.

The first difference signal generator (36) compares the front reference signal with the high frequency sampling signal outputted from the sampling unit (31) and generates a first difference signal D1. The second difference signal generator (37) compares the rear reference signal with the high frequency sampling signal outputted from the sampling unit (31) and generates a second difference signal D2.

Figure 4:
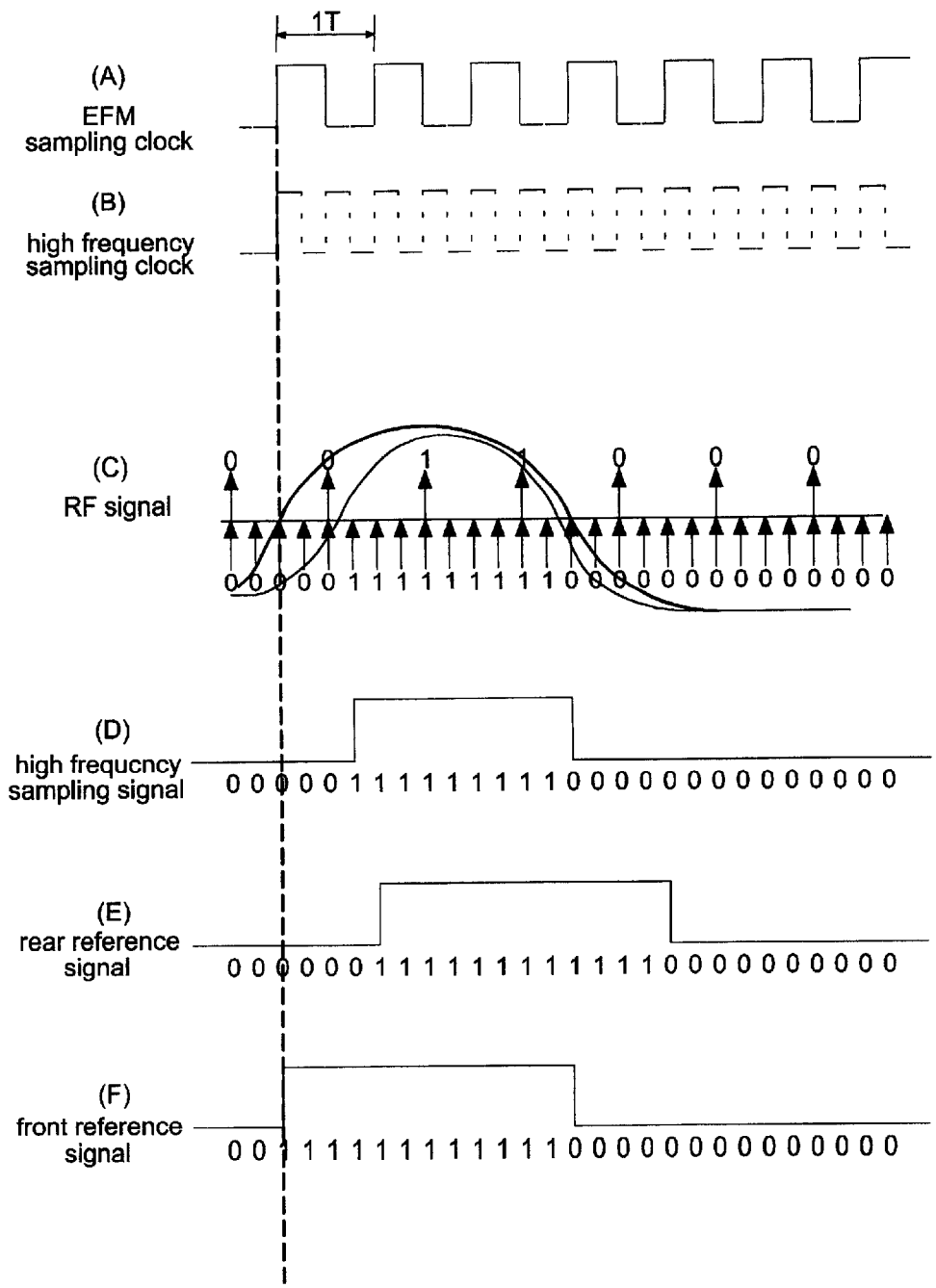
FIG. 4 is a waveform of the embodiment of the present invention performing the operation for protecting the run length in RLL code.

FIG. 4 is a waveform of the present invention performing the operation for protecting the run length in RLL code when the illegal run length is detected, wherein (A) is an EFM sampling clock, (B) is a high frequency sampling clock, (C) is a RF signal, (D) is a high frequency sampling signal, (E) is a rear reference signal, and (F) is a front reference signal. As shows in FIG. 4(C), the thick line is represented an ideal RF signal and the thin line is represented a real RF signal. The RF signal is sampled with the falling edge of the EFM sampling clock by the system, and the upper arrow signs are represented as sampled points and the upper numerals are represented as sampling data, as shown in FIG. 4(C). The RF signal is also sampled with the rising edge and falling edge of the high frequency sampling clock by the system, and the under arrow signs are represented as sampled points and the under numerals are represented as sampling data, as shown in FIG. 4(C). FIG. 4(D) shows that the frequency of the high frequency sampling signal is four times the frequency of the EFM signal and it means that there are 4 sampling data in each 1 T period.

As shown in FIG. 4, due to the RF signal is mixed with noise, the run length is changed to 2 T and the high frequency sampling signal is "0001111111110000". In the meanwhile the detector (34) outputs control signal to the front reference signal generator (32) and rear reference signal generator (33) respectively. The front reference signal generator (32) outputs a front reference signal "1111111111110000" according to the control signal of the detector (34), and the rear reference generator (33) outputs a rear reference signal "0000000000001111" according to the control signal of the detector (34). Then, the first difference signal generator (36) compares the high frequency sampling signal "0001111111110000" with the front reference signal "1111111111110000" and generates a difference signal "3". The second difference signal generator (37) compares the high frequency sampling signal "0001111111110000" with the rear reference signal "0000000000001111" and generates a difference signal "5". And then, the comparator (38) compares these differences outputted from the first difference signal generator (36) and second difference signal generator (37) and generates a select signal. Then, the output unit (39) selects the reference signal with smaller difference signal as a correct EFM signal according to the select signal.

Figure 5:
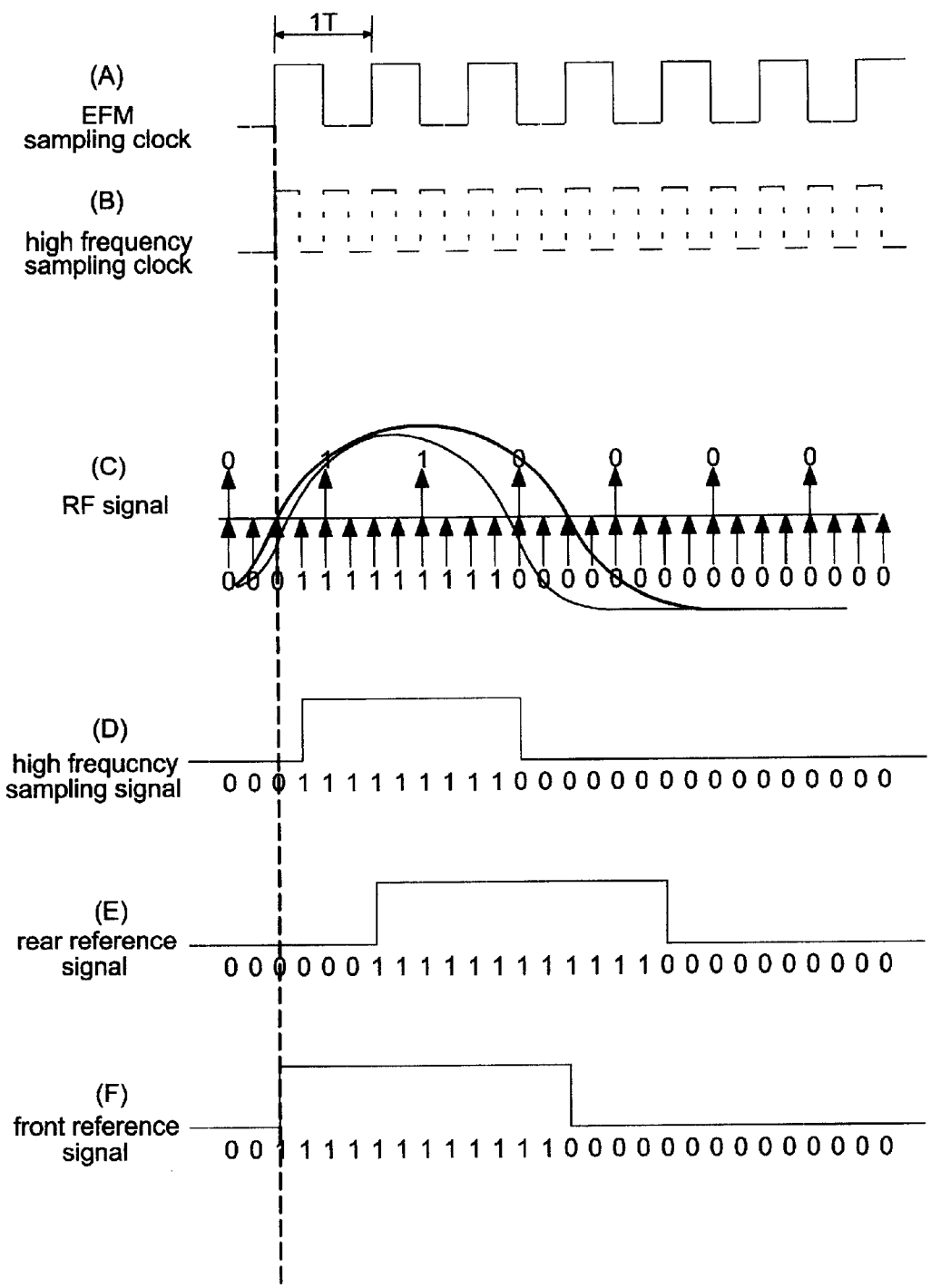
FIG. 5 is another waveform of the embodiment of the present invention performing the operation for protecting the run length in RLL code.

FIG. 5 is another waveform of the present invention performing the operation for correcting the run length in RLL code when the illegal run length of EFM signal is detected, wherein (A) is an EFM sampling clock, (B) is a high frequency sampling clock, (C) is a RF signal, (D) is a high frequency sampling signal, (E) is a rear reference signal, and (F) is a front reference signal. As shows in FIG. 5(C), the thick line is represented an ideal RF signal and the thin line is represented a real RF signal. The RF signal is sampled with the falling edge of the EFM sampling clock by the system and the upper arrow signs are represented as sampled points and the upper numerals are represented as sampling data, as shown in FIG. 5(C). The RF signal is also sampled with both the rising edge and falling edge of the high frequency sampling clock by the system, and the under arrow signs are represented as sampled points and the under numerals are represented as sampling data, as shown in FIG. 5(C). FIG. 5(D) shows that the frequency of the high frequency sampling signal is four times the frequency of the EFM signal and it means that there are 4 sampling data in each 1 T period.

As shown in FIG. 4, due to the RF signal is mixed with noise, the run length is changed to 2 T and the high frequency sampling signal is "0111111111000000". In the meanwhile the detector (34) outputs control signal to the front reference signal generator (32) and rear reference signal generator (33) respectively. The front reference signal generator (32) outputs a front reference signal "1111111111110000" according to the control signal of the detector (34), and the rear reference generator (33) outputs a rear reference signal "0000111111111111" according to the control signal of the detector (34). Then, the first difference signal generator (36) compares the high frequency sampling signal "0111111111000000" with the front reference signal "1111111111110000" and generates a difference signal "3". The second difference signal generator (37) compares the high frequency sampling signal "0111111111000000" with the rear reference signal "0000111111111111" and generates a difference signal "9". And then, the comparator (38) compares these differences outputted from the first difference generator (36) and second difference generator (37) and generates a select signal. Then, the output unit (39) selects the reference signal with smaller reference as a correct EFM signal according to the select signal.

Figure 6:
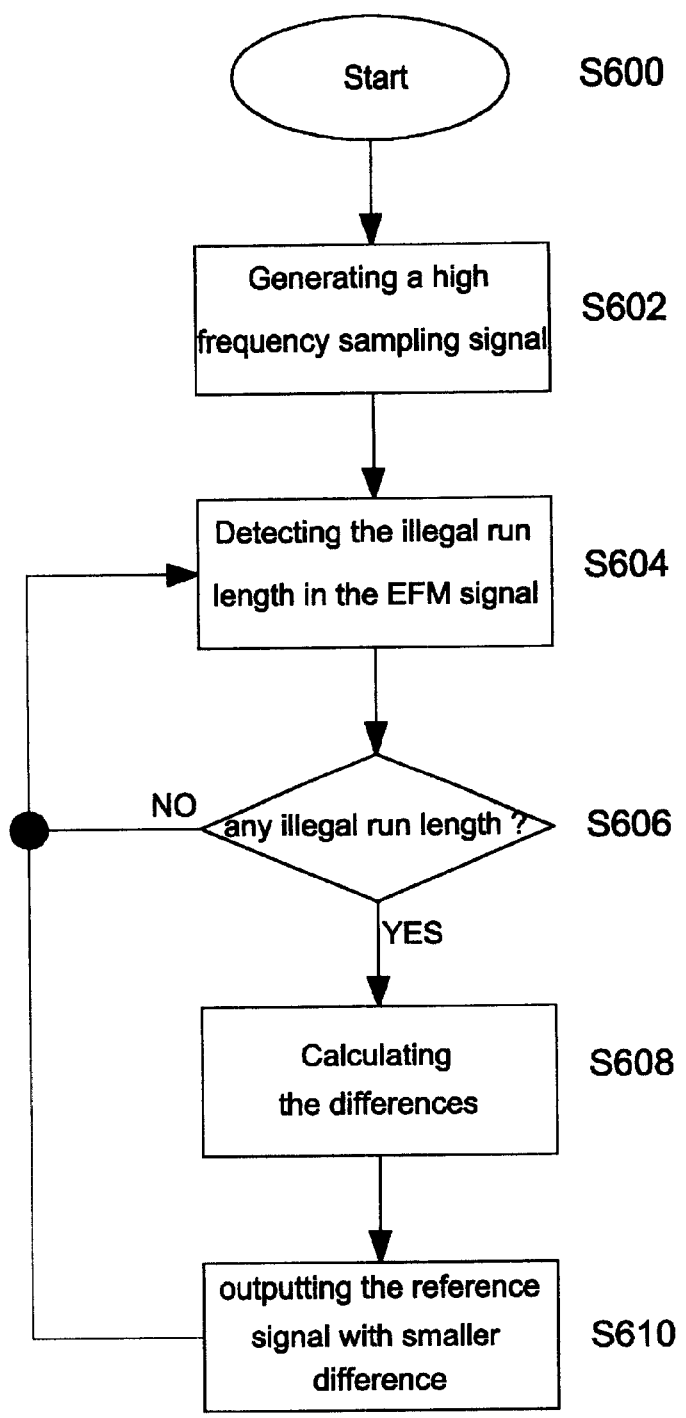
FIG. 6 is a flowchart showing a method for protecting the run length in RLL code.

FIG. 6 is a flow chart showing a data processing method for protecting the run length in RLL code of the present invention. The processing method comprises the steps of:

S600: Start.

S602: Generating a high frequency sampling signal. The processing method samples the RF signal by a high frequency sampling clock with higher frequency than the EFM sampling clock. The frequency of the high frequency sampling clock may be four or more times the frequency of the EFM sampling clock.

S604: Detecting the illegal run length in the EFM signal. The types of the illegal run length in RLL code include shorter than the minimum run length and longer than the maximum run length.

S606: Determining whether there is any illegal run length in the EFM signal. If there are the illegal run length in the EFM signal, jump to the step S608, otherwise jump back to the step S604.

S608: Calculating the differences. Compare the high frequency sampling signal with a front reference signal and compare the high frequency sampling signal with a rear reference signal, respectively, to calculate the difference signals. It means to calculate its similarity.

S610: Selecting and outputting the reference signal with smaller difference as a correct EFM signal. The smaller difference means that the first or second reference signal is closer to the illegal run length of EFM signal and the first or second reference signal with smaller difference could be employed as a correct EFM signal to replace the illegal run length of EFM signal.

Clearly, the present invention is simple and exactly due to the circuit for protecting the run length in RLL code to prevent the illegal run length of EFM signal when the illegal run length of EFM signal is detected and to generate a correct EFM signal based on difference signals by comparing the front and rear reference signals of the EFM signal so as to correct the illegal run length of EFM signal. As such, the present invention isn't to be limited to any particular embodiment described here. Rather, the present invention is defined by the claims which follow.

What is claimed is:

1. A circuit for protecting the run length in RLL code and correcting the illegal run length in a EFM signal, the circuit comprising:
    a sampling unit for sampling an input signal by a high frequency sampling clock with higher frequency than the frequency of said EFM signal, and generating a high frequency sampling signal;
    a detector for receiving said EFM signal, detecting whether there is any illegal run length in said EFM signal, and generating a control signal;
    a front reference signal generator for generating a front reference signal corresponding to said EFM signal according to said control signal generated from said detector;
    a rear reference signal generator for generating a rear reference signal corresponding to said EFM signal according to said control signal generated from said detector;
    a first difference signal generator for generating a first difference signal based on said front reference signal and said high frequency sampling signal;
    a second difference signal generator for generating a second difference signal based on said rear reference signal and said high frequency sampling signal;
    a comparator for generating a select signal based on said first difference signal and said second difference signal; and
    an output unit for outputting a corrected EFM signal selected from the front reference signal and the rear reference signal according to said select signal.

2. The circuit according to claim 1, wherein said select signal outputted from said comparator comprises the following conditions:
    said first difference signal is greater than said second difference signal;
    said first difference signal is equal to said second difference signal; and
    said first difference signal is less than said second difference signal.

3. The circuit according to claim 1, wherein the frequency of said high frequency sampling clock is four times than the frequency of said EFM signal.

4. The circuit according to claim 3, wherein the illegal run length in said EFM signal is 2 T.

5. The circuit according to claim 4, wherein said front reference signal is "0000111111111111".

6. The circuit according to claim 4, wherein said front reference signal is "1111111111110000".

7. A method for protecting the run length in RLL code, the method comprising the following steps of:
    sampling an input signal with a sampling clock to generating an EFM signal;
    sampling the input signal with a high frequency sampling clock to generate an high frequency sampling signal;
    detecting continuously whether there is any illegal run length in said EFM signal and generating a correcting signal;
    generating a front reference signal and a rear reference signal according to the correcting signal;
    generating difference signals according to the front and rear reference signals and the high frequency sampling signal, respectively
    comparing said difference signals and outputting an select signal; and
    selecting and outputting a correct signal from the front and rear reference signals based on said select signal.

8. The method according to claim 7, wherein said generating difference signals comprising the steps of:
    generating a first difference signal according to said front reference signal and said high frequency sampling signal; and
    generating a second difference signal according to said rear reference signal and said high frequency sampling signal.

9. The method according to claim 8, wherein the frequency of the high frequency sampling clock is four times the frequency of the sampling clock.

10. The method according to claim 9, wherein the illegal run length in the EFM signal is 2 T.

11. The method according to claim 10, wherein the front reference signal is "0000111111111111".

12. The method according to claim 10, wherein the aforementioned front reference signal is "1111111111110000".

* * * * *